(12) United States Patent
Kanazawa (10) Patent No.: US 6,343,403 B1
(45) Date of Patent: Feb. 5, 2002

(54) WIPER DEVICE, AND METHOD OF MANUFACTURING HOLLOW FRAME FOR WIPER DEVICE

(75) Inventor: Keisuke Kanazawa, Hamamatsu (JP)

(73) Assignee: Asmo Co., Ltd. (JP)

( * ) Notice: Subject to any disclaimer, the term of this patent is extended or adjusted under 35 U.S.C. 154(b) by 0 days.

(21) Appl. No.: 09/352,944

(22) Filed: Jul. 14, 1999

(30) Foreign Application Priority Data

Jul. 24, 1998 (JP) .......................................... 10-209236
Aug. 5, 1998 (JP) .......................................... 10-221574

(51) Int. Cl.$^7$ ................ B60S 1/16; B60S 1/06
(52) U.S. Cl. .............. 15/250.3; 15/250.31; 74/42; 296/96.17
(58) Field of Search .................... 15/250.3, 250.31, 15/250.27, 250.14; 296/192, 96.17; 74/42, 43, 51, 96, 606 R; 248/200, 214

(56) References Cited

U.S. PATENT DOCUMENTS 5,142,941 A * 9/1992 Amann et al. ............. 15/250.3
5,396,681 A   3/1995 Hara ........................... 15/250

FOREIGN PATENT DOCUMENTS

| EP | 0430375 A | * | 5/1991 | ................ 15/250.3 |
| FR | 2621287 A | * | 4/1989 | ................ 15/250.3 |
| GB | 2227926 A | * | 8/1990 | ................ 15/250.3 |
| JP | 5-32152 |   | 2/1993 |   |
| JP | 5-500935 |   | 2/1993 |   |
| JP | 5-22226 |   | 3/1993 |   |
| JP | 7-31525 |   | 6/1995 |   |
| JP | 9-175336 |   | 7/1997 |   |

* cited by examiner

Primary Examiner—Gary K. Graham
(74) Attorney, Agent, or Firm—Parkhurst & Wendel, L.L.P.

(57) ABSTRACT

A wiper device is a frame-integrated type device in which a pair of pivot holders are formed integrally with a hollow frame. The hollow frame can be formed from a pair of split frames or from a single piece tubular component. Each split frame has a mounting portion having a non-hollow, substantially U-shaped cross-section. The mounting portions of the split frames are overlapped with each other and fastened together with a wiper motor so as to be connected to each other. Many types of hollow frames can be formed by changing combinations of two split frames having different sizes, and an optimum hollow frame can be formed for vehicles having different sizes and layouts. The single piece tubular component has a mounting portion at an intermediate position which is non-hollow and has a substantially U-shaped cross-section, and gradually changing portions whose cross-sectional configuration gradually changes from non-hollow to hollow.

15 Claims, 7 Drawing Sheets

WIPER DEVICE, AND METHOD OF MANUFACTURING HOLLOW FRAME FOR WIPER DEVICE

BACKGROUND OF THE INVENTION

1. Field of the Invention

The present invention relates to a wiper device for wiping a windshield glass of an automobile and a method of manufacturing a hollow frame for a wiper device.

2. Description of the Related Art

A wiper device, which wipes a windshield glass of an automobile, wipes off rain drops and the like on the windshield glass in such a manner that a wiper arm mounted to a pivot shaft reciprocates pivotally in a predetermined range by the rotation of the pivot shaft.

In such a wiper device, the pivot shaft is rotatably supported by a wiper bracket having a pivot holding portion. The wiper bracket is fixed to a vehicle body (e.g., a cowl panel or a suspension tower disposed below the windshield glass) by means of mounting bolts. In a vehicle having a pair of wiper arms and blades, pivot shafts are respectively provided at both sides of the vehicle in the transverse direction thereof, and wiper brackets for supporting these pivot shafts are also respectively fixed to both sides of the vehicle body in the transverse direction. Further, there are what are known as frame-integrated type wiper devices, in which a pair of wiper brackets are formed integrally with a frame serving as a support base for a wiper motor or the like (e.g., Japanese Patent Application Laid-Open (JP-A) No. 9-175336, Japanese Utility Model Laid-Open (JP-U) No. 7-31525, or Japanese Utility Model Laid-Open (JP-U) No. 5-22226).

In a wiper device disclosed in the above-mentioned Japanese Patent Application Laid-Open (JP-A) No. 9-175336, an overall assembly of a motor and a link is formed by welding and fixing a bracket to a support pipe (a pipe frame) which connects a pair of pivot holders to each other, and mounting and fixing a wiper motor to the bracket. This can provide a relatively simple and compact structure.

However, in a structure such as the above wiper device in which the support pipe (the pipe frame) is formed integrally with the pivot holders, the positions at which respective pivot holders located at both end portions of the support pipe are mounted to a vehicle body, and the position at which the wiper motor is mounted are determined by necessity (as a matter of course). Namely, no degree of freedom is provided for the mounting of this frame assembly (respective pivot holders) to the vehicle body. Further, depending on the size of the vehicle (the transverse dimension of the vehicle, mounting positions or the like), the positions of the pivot holders to be fixed to the end portions of the support pipe may be incompatible, or the position at which the wiper motor is mounted may have to be changed. Therefore, there is a drawback in that many types of support pipes (i.e., wiper devices) have to be prepared for each vehicle having a different size or layout.

In a wiper device disclosed in Japanese Utility Model Laid-Open (JP-U) No. 7-31525 mentioned above, an overall assembly of a motor and a link is formed by welding and fixing a bracket to a support pipe (a pipe frame) which connects a pair of pivot holders to each other, and mounting and fixing a wiper motor to the bracket. This can provide a relatively simple and compact structure. Moreover, this device has an advantage in that adjustment of the angle of the motor mounting surface of the bracket is made possible upon mounting of the frame assembly (respective pivot holders) to the vehicle body by relatively rotating the pivot holders and the support pipe around the axes thereof and adjusting the state of the connection between the pivot holders and the support pipe.

However, in the case of the support pipe which is made hollow in the longitudinal direction thereof, there is a drawback in that the support pipe deforms undesirably when measures, such as fastening, riveting or the like, are taken for applying fastening force or pressure to the support pipe so as to directly fix the wiper motor to the support pipe (the pipe frame).

As a frame which is not deformed by pressure at the time of fixing the wiper motor thereto, there exists a bar-shaped frame of a wiper device disclosed in Japanese Utility Model Laid-Open (JP-U) No. 5-22226. The frame is formed by bending a steel plate and has a substantially U-shaped cross-section extending over the entire length thereof in the longitudinal direction. However, a drawback arises in that the frame has lower flexural strength than a pipe frame. Moreover, since the bar-shaped frame is formed so as to have a substantially U-shaped cross-section extending over the entire length thereof in the longitudinal direction, when a wiper device is manufactured in such a manner that a wiper motor is directly fixed to the bar-shaped frame by bolts or rivets, an angle of a surface (i.e., an angle of a planar portion) of the bar-shaped frame to which the wiper motor is mounted is determined by necessity (as a matter of course) due to its cross-sectional configuration (the substantially U-shaped configuration). In other words, there is a drawback in that an output shaft of the wiper motor cannot be disposed at an arbitrary angle or position around the axis of the frame.

All of the conventional frame-integrated type wiper devices described above have both advantages and drawbacks, and a wiper device which can overcome the above drawbacks has been desired.

SUMMARY OF THE INVENTION

In view of the aforementioned circumstances, a first object of the present invention is to provide a wiper device and a method of manufacturing a hollow frame for a wiper device, in which firm fixing is obtained without any special fixing parts being required to a frame which is relatively lightweight and has a high rigidity and strength, and the frame is not subjected to deformation even when a separate member is firmly fixed to the frame.

In view of the aforementioned facts, a second object of the present invention is to provide a wiper device in which frames having many different sizes can be formed by changing combinations of the frames, and which can be applied to vehicles having different sizes and layouts and can freely set the direction in which a drive source is fastened and fixed to the frame around the axis thereof.

In view of the aforementioned circumstances, a third object of the present invention is to provide a method of manufacturing a hollow frame for the wiper device described above.

In order to achieve the first object of the present invention, in accordance with a first aspect of the present invention, there is provided a wiper device comprising: a plurality of pivot shafts, each pivot shaft having a distal end portion to which a wiper arm is fixed; a plurality of pivot holders fixed to a vehicle body, each pivot holder rotatably supporting each of the plurality of pivot shafts; a hollow frame connecting each of the plurality of pivot holders to each other; a drive source fixed to the hollow frame; and a link rod for transmitting a driving force generated by the drive source to each of the plurality of pivot shafts, wherein the hollow frame includes a mounting portion formed so as to be non-hollow by flattening the intermediate portion of the hollow frame in the longitudinal direction thereof, and the drive source is fixed to the mounting portion.

In this wiper device, the pivot holders, each of which rotatably supports the pivot shaft, are connected to each other via the hollow frame, and the drive source is fixed directly to the mounting portion (the flat bearing surface for mounting) of the hollow frame, thereby forming the assembly as a whole. This assembly is fixed to a vehicle body structural member provided below the windshield glass.

Here, since the wiper device employs a hollow frame, the frame as a whole has a high rigidity and is lightweight in essence. Further, the mounting portion having the flat bearing surface for mounting is formed at the intermediate position of the hollow frame in the longitudinal direction, and the drive source is fixed directly to the mounting portion (the flat bearing surface for mounting) of the hollow frame. Therefore, even when the drive source is firmly fixed to the mounting portion, the hollow frame is not subjected to deformation.

In addition, since the drive source is fixed directly to the mounting portion (i.e., the flat bearing surface for mounting) of the hollow frame as described above, the mounting angle of the drive source relative to the hollow frame is set with stability.

As described above, the wiper device according to the first aspect is lightweight and has a high rigidity and strength. Further, in this wiper device, firm fixing to the frame is obtained without other special fixing parts being required, and the frame is not subjected to deformation even when the drive source is firmly fixed to the frame.

In order to achieve the second object of the present invention, in accordance with a second aspect of the present invention, there is provided a wiper device comprising: a plurality of pivot shafts, each pivot shaft having a distal end portion to which a wiper arm is fixed; a plurality of pivot holders fixed to a vehicle body, each pivot holder rotatably supporting each of the plurality of pivot shafts; a hollow frame connecting each of the plurality of pivot holders to each other; a drive source fixed to the hollow frame; and a link rod for transmitting a driving force generated by the drive source to each of the plurality of pivot shafts, wherein the hollow frame is formed by a pair of split frames, each split frame including a mounting portion having a flat bearing surface for mounting to which surface the drive source is directly fixed, the mounting portion being formed so as to be non-hollow with a substantially U-shaped cross-section by flattening one end portion of a hollow base material, and a connecting portion, which is the other end portion of the hollow base material formed so as to have an annular cross-section and connected to the pivot holder, and the mounting portion of one of the pair of split frames and the mounting portion of the other of the pair of split frames are overlapped with each other so as to be connected and fixed to each other.

In this wiper device, the pivot holders, each of which rotatably supports the pivot shaft, are connected to each other via the hollow frame, and the drive source is fixed directly to the mounting portion (the flat bearing surface for mounting) of the hollow frame, thereby forming an assembly as a whole. This assembly is fixed to a vehicle body structural member provided below the windshield glass.

Here, the hollow frames in the wiper device are formed from the pair of split frames. Each split frame includes the mounting portion having the flat bearing surface for mounting to which surface the drive source is directly fixed, and the hollow (having an annular cross-section) connecting portion which is connected to the pivot holder. The mounting portions of the pair of split frames overlap with each other so that the pair of split frames are connected and fixed to each other.

Therefore, by preparing various types of split frames having different lengths or the like (e.g., those having connecting portions or the like with different lengths) and changing the combinations of the split frames so as to form a pair of split frames, many types of hollow frames can be formed using a few types of split frames. Namely, an optimum hollow frame for the size of the vehicle (the transverse dimension of the vehicle, and the positions at which the pivot holders are mounted) can be formed by changing the combinations of the split frames.

In addition, the connecting portion of the hollow frame by which the hollow frame is connected to the pivot holder is formed so as to have an annular cross-section, and is fitted together with and connected to the pivot holder. Therefore, adjustment and setting of the mounting angle of the mounting portion of the hollow frame relative to the vehicle body, i.e., the mounting angle of the drive source relative to the vehicle body is made possible by pivoting the hollow frame around the axis thereof in accordance with the state in which the pivot holders are mounted, which state is determined in accordance with the type of the vehicle body. Namely, the direction in which the drive source is fastened and fixed to the hollow frame is not limited, and degree of freedom is provided for the direction.

As described above, in the wiper device according to the second aspect of the present invention, hollow frames having many different sizes can be formed by changing the combinations of the split frames and can be applied to vehicles having different sizes and layouts. Further, it is possible to freely set the direction in which the drive source is fastened and fixed to the frame around the axis thereof.

In order to achieve the third object of the present invention, in accordance with a third aspect of the present invention, there is provided a method of manufacturing a hollow frame for a wiper device comprising a plurality of pivot holders fixed to a vehicle body, each pivot holder rotatably supporting a pivot shaft to whose distal end portion a wiper arm is fixed, a hollow frame connecting each of the plurality of pivot holders to each other, a drive source fixed to the hollow frame, and a link rod for transmitting a driving force generated by the drive source to the pivot shaft, wherein a mounting portion having a non-hollow, U-shaped cross-section is formed at the intermediate portion of the hollow frame in the longitudinal direction by press-working the cross-sectionally annular shaped, hollow base material, the mounting portion having a flat bearing surface for mounting to which surface the drive source is directly fixed.

In the method of manufacturing a hollow frame for a wiper device according to the third aspect, a mounting portion having the flat bearing surface for mounting and whose cross-section is substantially U-shaped is formed in the hollow frame so as to be non-hollow by press-working a portion of the hollow base material having an annular cross-section. Since the drive source is fixed directly to this mounting portion, the mounting angle of the drive source relative to the hollow frame is set with stability.

As described above, in the method of manufacturing a hollow frame for a wiper device according to the third aspect of the present invention, it is possible to easily manufacture

DESCRIPTION OF THE PREFERRED EMBODIMENTS

A wiper device 10 has a pair of pivot holders 12 and 14. The pivot holders 12 and 14 are formed symmetrically and have the same basic construction. The pivot holder 12 has a cylindrical portion 16, while the pivot holder 14 has a cylindrical portion 18. These cylindrical portions 16 and 18 are formed in a cylindrical configuration, and pivot shafts 20 and 22 are each inserted into the cylindrical portions 16 and 18 so that the cylindrical portions 16 and 18 rotatably support the pivot shafts 20 and 22, respectively. Pivot levers 24 and 26 are respectively fixed to the lower end portions of the pivot shafts 20 and 22, and the pivot shafts 20 and 22 are each rotated due to the pivotal movement of the pivot levers 24 and 26. Further, mounting holes 28 and 30 are formed at one end portions, which are narrower than the other end portions, of the pivot holders 12 and 14, respectively. The wiper device 10 is fixed to a vehicle body by mounting bolts inserted into the mounting holes 28 and 30.

The pivot holders 12 and 14 are provided with connecting shafts 32 and 34 disposed at the side wall portions of the pivot holders 12 and 14 at the sides opposite to the mounting holes 28 and 30. The connecting shafts 32 and 34 are solid shafts each having a circular cross-section, and the end portions thereof are connecting portions 36 and 38, respectively, which are fitted together with and connected to a hollow frame 42 which will be described below. Note that the connecting shafts 32 and 34 are not limited to the solid shafts having circular cross-sections, but may be formed as hollow shafts having annular cross-sections.

Figure 3:
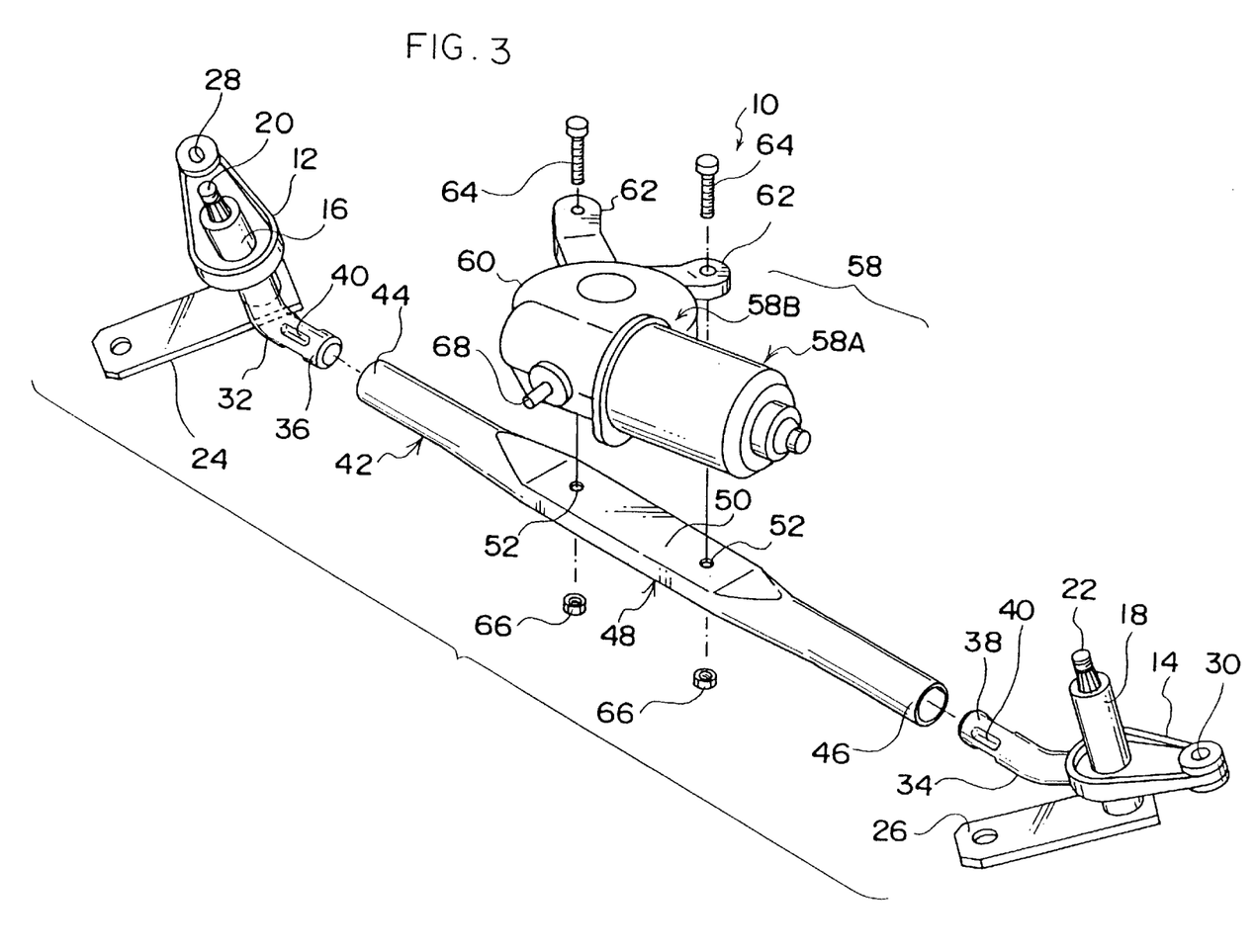
FIG. 3 is an exploded perspective view showing the structure of a principal portion of the wiper device according to the embodiment of the present invention.

As shown in FIG. 3, concave portions 40 are formed on each of the connecting portions 36 and 38. The connecting portion 36 of the pivot holder 12 and the connecting portion 38 of the pivot holder 14 are connected to each other via the hollow frame 42.

The hollow frame 42 is formed from a pair of split frames 42A and 42B. One end portion of the one split frame 42A in the longitudinal direction thereof is a connecting portion 44 which corresponds to the connecting portion 36 of the connecting shaft 32 described above. The connecting portion 44 has an annular cross-section and is fitted together with the connecting portion 36, and in this state, the connecting portion 44 is crimped to correspond with the shape of the concave portions 40 described above so as to be connected and fixed to the connecting portion 36.

Figure 4:
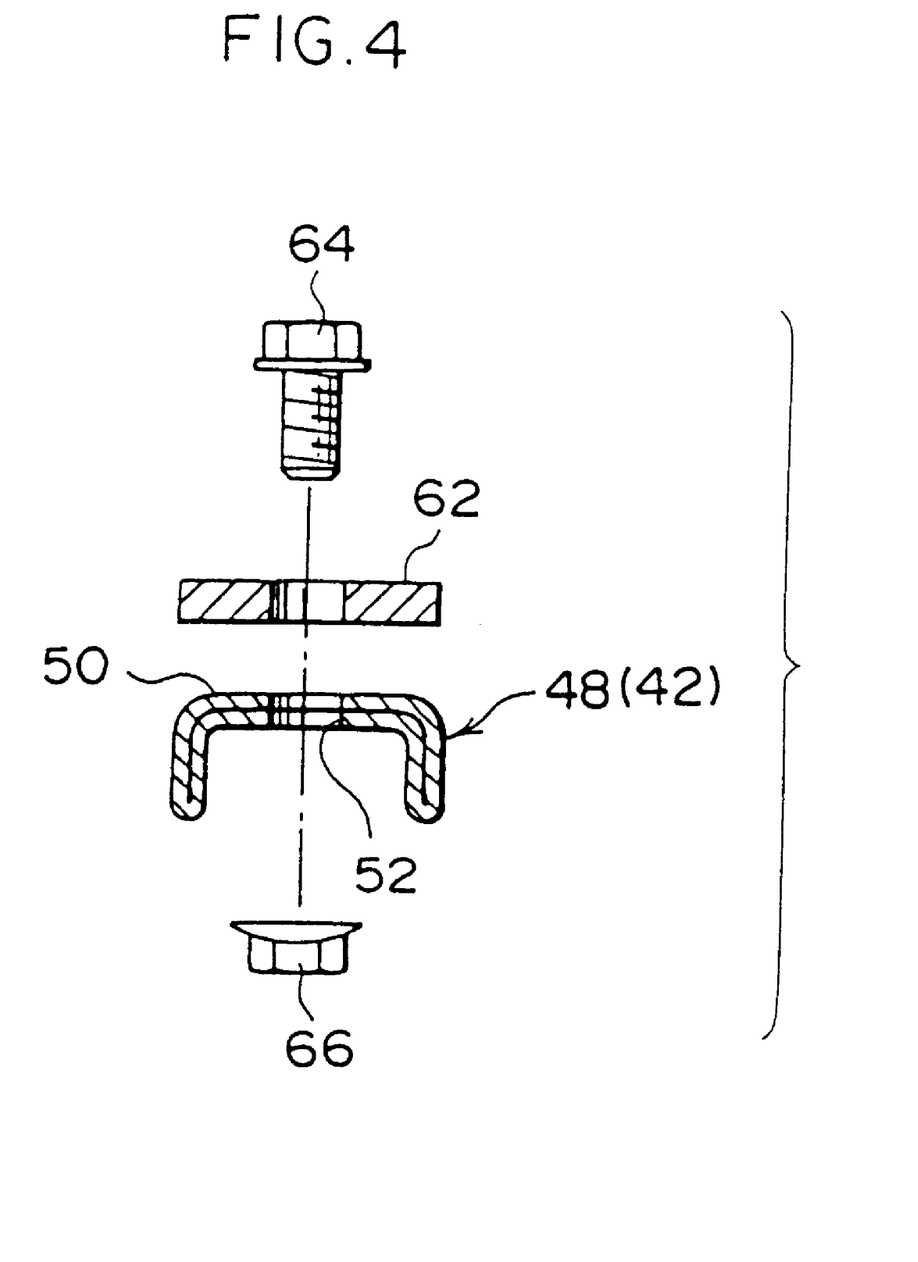
FIG. 4 is a cross-sectional view showing details of a mounting portion of a hollow frame forming the wiper device according to the embodiment of the present invention.
Figure 5A:
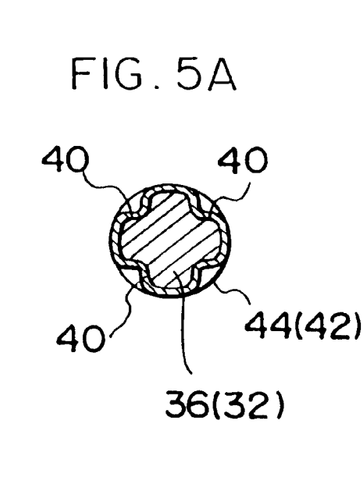
FIG. 5A is a cross-sectional view taken along the line A—A in FIG. 2, showing details of a gradually-changing portion of the hollow frame forming the wiper device according to the embodiment of the present invention.
Figure 5B:
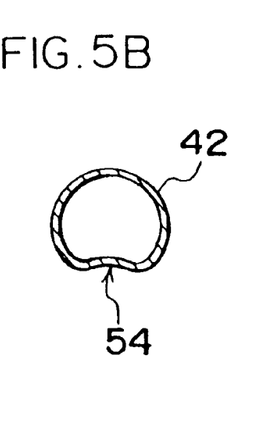
FIG. 5B is a cross-sectional view taken along the line B—B in FIG. 2, showing details of the gradually-changing portion of the hollow frame forming the wiper device according to the embodiment of the present invention.
Figures 5C, 5D:
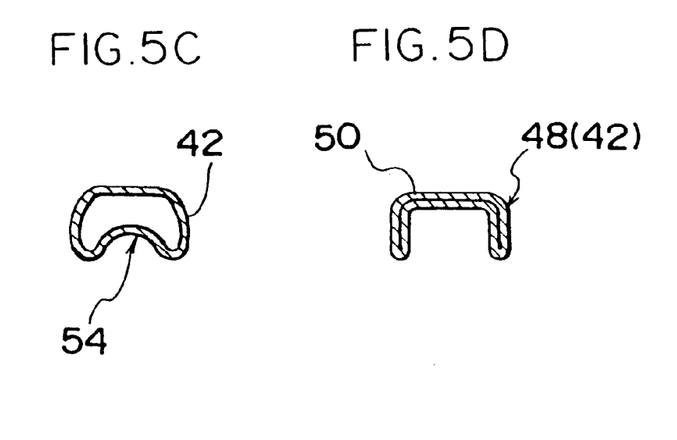
FIG. 5C is a cross-sectional view taken along the line C—C in FIG. 2, showing details of the gradually-changing portion of the hollow frame forming the wiper device according to the embodiment of the present invention.
FIG. 5D is a cross-sectional view taken along the line D—D in FIG. 2, showing details of the gradually-changing portion of the hollow frame forming the wiper device according to the embodiment of the present invention.

A mounting portion 48 is formed at the other end portion of the split frame 42A in the longitudinal direction. As shown in FIG. 4, the mounting portion 48 is formed to have a non-hollow, substantially U-shaped cross-section, and the upper surface thereof is a flat bearing surface for mounting 50. Moreover, a pair of mounting holes 52 are formed in the mounting portion 48 to fix a drive source, which will be described later. The mounting holes 52 pass completely through the mounting portion 48 (the flat bearing surface for mounting 50).

Gradually-changing portions 54 and 56 are provided at both sides of the mounting portion 48 of the hollow frame 42 in the longitudinal direction. FIGS. 5A through 5D show details of the gradually-changing portions 54 and 56 in cross-sections taken along the lines A—A through D—D in FIG. 2, respectively. As shown in each drawing, the gradually-changing portions 54 and 56 are formed in such a way that the cross-section of each of the gradually-changing portions 54 and 56 gradually changes from a non-hollow, substantially U-shaped cross-section to a hollow annular cross-section as the gradually-changing portions 54 and 56 run from the mounting portion 48 toward the connecting portions 44 and 46, respectively.

On the other hand, the other split frame 42B is basically the same in construction as the above-described split frame 42A, and one end portion of the split frame 42B in the longitudinal direction serves as a connecting portion 46 which corresponds to the connecting portion 38 of the above-mentioned connecting shaft 34. The connecting portion 46 has an annular cross-section and is fitted together with the connecting portion 38, and in this state, the connecting portion 46 is crimped to correspond with the shape of the concave portions 40 described above so as to be connected and fixed to the connecting portion 38.

A mounting portion 49 is formed at the other end portion of the split frame 42B in the longitudinal direction. The mounting portion 49 has a non-hollow, substantially U-shaped cross-section in the same way as in the mounting portion 48 of the above-mentioned split frame 42A, and the upper surface thereof is a flat bearing surface for mounting 51. In this case, the transverse dimension of the mounting portion 49 (the flat bearing surface for mounting 51) is set so as to correspond to the length of the gap between facing side walls of the mounting portion 48 having the substantially U-shaped cross-section, such that the mounting portion 48 is positioned over the mounting portion 49 in an overlapping manner. Further, a pair of mounting holes 53 are formed in the mounting portion 49. The mounting holes 53 pass completely through the mounting portion 49 (the flat bearing surface for mounting 51).

The gradually-changing portion 56, which is similar to the above-mentioned gradually-changing portion 54, is provided at one side of the mounting portion 49 of the split frame 42B in the longitudinal direction. The gradually-changing portion 56 is formed in such a way that the cross-section of the gradually-changing portion 56 gradually changes from a non-hollow, substantially U-shaped cross-section to a hollow annular cross-section as the gradually-changing portion 56 runs from the mounting portion 49 toward the connecting portion 46.

The split frames 42A and 42B having the above constructions form the hollow frame 42 in such a way that the mounting portion 48 of the split frame 42A is positioned over the mounting portion 49 of the split frame 42B in an overlapping manner and a wiper motor 58 serving as a drive source, which will be described later, is connected and fixed to the split frames 42A and 42B.

Figure 6A:
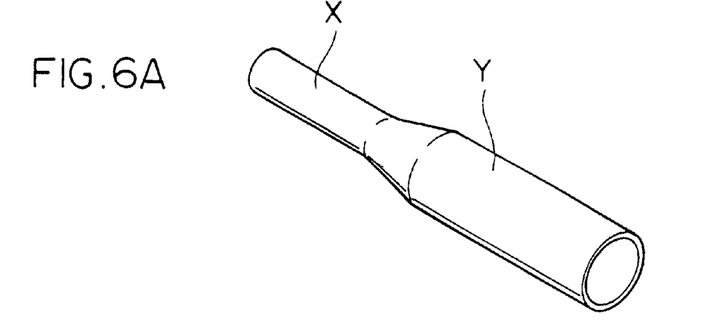
FIG. 6A is a perspective view showing a hollow base material in a manufacturing process of the hollow frame of the wiper device according to the embodiment of the present invention.
Figure 6B:
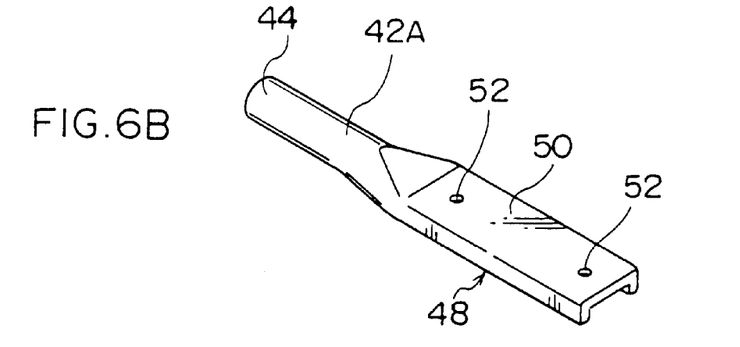
FIG. 6B is a perspective view showing one split frame in the manufacturing process of the hollow frame of the wiper device according to the embodiment of the present invention.

Moreover, the hollow frame 42 (the pair of split frames 42A and 42B) having the above construction is formed by press-working a hollow base material (a pipe material) having an annular cross-section. That is, as shown in FIG. 6A, a hollow base material (a pipe material) X having an annular cross-section is used. An extended diameter portion Y is formed in advance by carrying out a processing for increasing the diameter dimension of a predetermined portion of the hollow base material X. In this case, for example, sizing can be used as the processing for increasing the diameter dimension. The extended diameter portion Y, which has been formed by the diameter-increasing processing, is thereafter press-worked so as to form the above-described mounting portions 48 and 49, the gradually-changing portions 54 and 56 and the like.

In particular, the aforementioned gradually-changing portions 54, 56 are formed simultaneously by the press-working process in which the mounting portions 48 and 49 are formed. In addition, the pair of mounting holes 52 and 53 of the mounting portions 48 and 49 described above are also formed by the same press-working process as the process in which the mounting portions 48 and 49 are formed.

Furthermore, a wiper motor 58 serving as a drive source is mounted to the flat bearing surface for mounting 50 of the mounting portion 48 of the hollow frame 42. The wiper motor 58 is constructed such that a motor portion 58A and a gear portion 58B are formed integrally and a pair of mounting legs 62 project from a housing 60 for the gear portion 58B. The mounting legs 62 are positioned on the flat bearing surface for mounting 50 of the mounting portion 48 of the hollow frame 42 (the split frame 42A), and in this state, bolts 64 pass through the mounting holes 52 and 53 of the split frames 42A and 42B, respectively, and are fastened and fixed by nuts 66. Namely, by fixing the wiper motor 58 to the hollow frame 42 (the split frame 42A), the split frames 42A and 42B which form the hollow frame 42 are connected and fixed to each other as well. Moreover, a positioning pin 68 is formed on the housing 60 for the wiper motor 58 and projects toward the front side of the housing 60 (toward the lower side of the paper in FIG. 1, and in a direction perpendicular to the surface of the paper in FIG. 2) so as to be inserted into a positioning hole (not shown) formed in the vehicle body. As a result, the wiper motor 58 is positioned relative to the vehicle body and supported thereby.

Further, the mounting portion 48 is formed at the intermediate portion of the hollow frame 42 in the longitudinal direction. As shown in FIG. 4, the mounting portion 48 is formed in a non-hollow, substantially U-shaped cross-section, and the upper surface thereof serves as the flat bearing surface for mounting 50. Furthermore, the pair of mounting holes 52 are formed in the mounting portion 48 to fix a drive source, which will be described below. The mounting holes 52 pass completely through the mounting portion 48 (the flat bearing surface for mounting 50).

The hollow frame 42 constructed as described above (the mounting portion 48, the gradually-changing portions 54 and 56 and the like) is formed by applying press-working a hollow base material (a pipe material) having an annular cross-section. In particular, the aforementioned gradually-changing portions 54 and 56 are formed simultaneously by the press-working process in which the mounting portion 48 is formed. In addition, the pair of mounting holes 52 of the mounting portion 48 described above are formed by the same press-working process as the process in which the mounting portion 48 is formed.

Moreover, the positioning pin 68 is formed on the housing 60 for the wiper motor 58 and projects toward the front side of the housing 60 (toward the lower side of the paper in FIG. 1, and in a direction perpendicular to the surface of the paper in FIG. 2) so as to be inserted into the positioning hole (not shown) formed in the vehicle body. As a result, the wiper motor 58 is positioned relative to the vehicle body and supported thereby.

An output shaft 70 of the wiper motor 58 projects toward the rear surface of the housing 60 (toward the rear surface of the paper in FIG. 1, and toward the lower side of the paper in FIG. 2), and one end portion of a crank arm 72 is mounted to the end portion of the output shaft 70. Link rods 76 and 78 are connected via a ball joint 74 to the other end portion of the crank arm 72. The one link rod 76 is connected via a ball joint 80 to the pivot lever 24 of the pivot shaft 20 supported by the pivot holder 12, while the other link rod 78 is connected via a ball joint 82 to the pivot lever 26 of the pivot shaft 22 supported by the pivot holder 14. As a result, when the wiper motor 58 operates and the crank arm 72 is pivoted, driving force is transmitted via the link rods 76 and 78 and the pivot levers 24 and 26 to the pivot shafts 20 and 22, thereby rotating the pivot shafts 20 and 22, respectively.

Further, a wiper arm and a blade (not shown) are mounted to the distal end portions of the respective pivot shafts 20 and 22. When the respective pivot shafts 20 and 22 are rotated, the wiper arm and the blade reciprocate pivotally in a predetermined range.

As described above, the wiper device 10 is the so-called frame-integrated type wiper device and is constructed such that the pair of pivot holders 12 and 14 are formed integrally with the hollow frame 42, which serves as the support base for the wiper motor 58.

Next, the operation of the embodiment of the present invention will be described.

Figure 1:
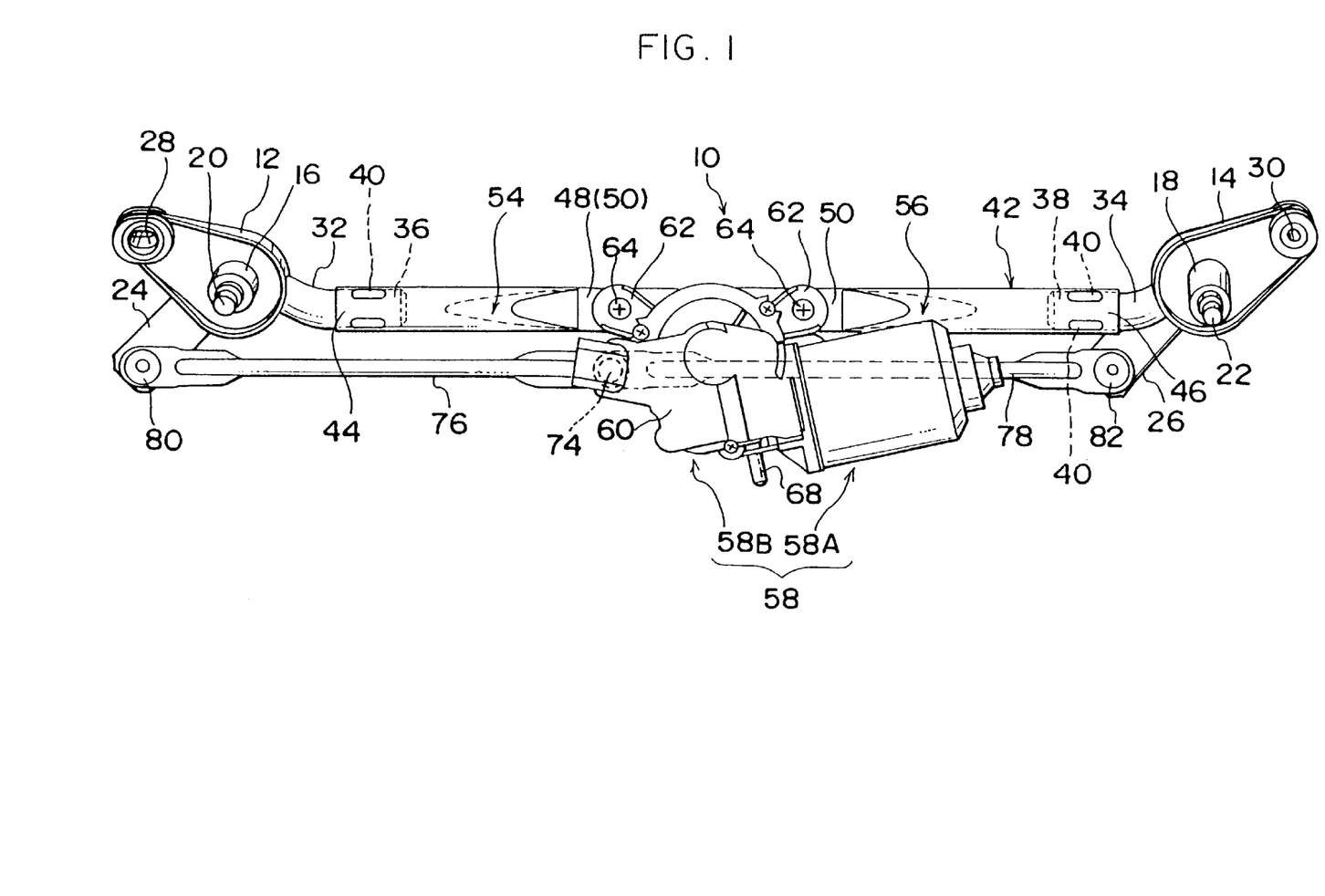
FIG. 1 is a plan view showing the overall structure of a wiper device according to an embodiment of the present invention.
Figure 2:
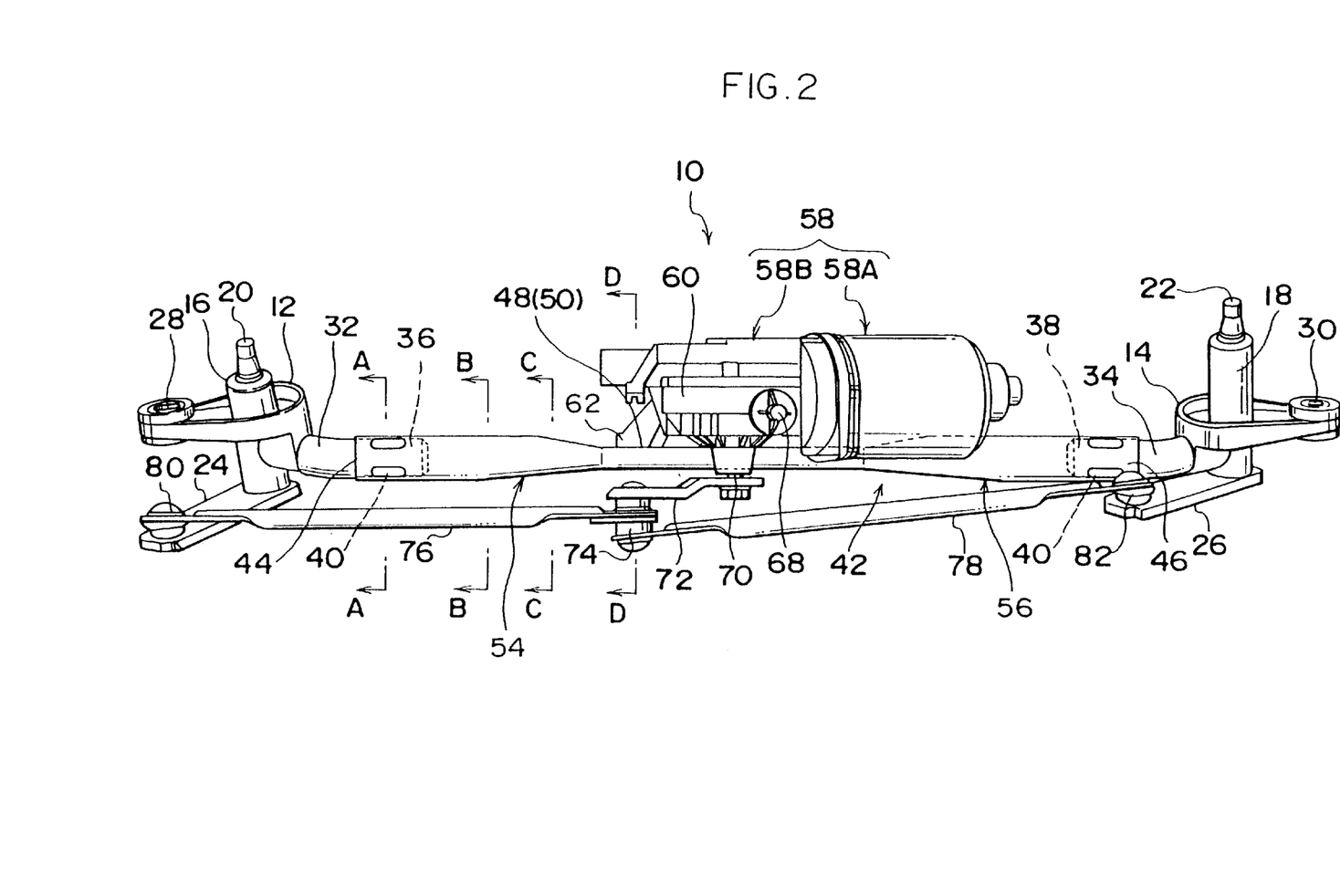
FIG. 2 is a front elevational view showing the overall structure of the wiper device according to the embodiment of the present invention.

FIG. 1 is a plan view showing the overall structure of the wiper device 10 according to the embodiment of the present invention, FIG. 2 is a front elevational view showing the overall structure of the wiper device 10, and FIG. 3 is an exploded perspective view showing the structure of a principal portion of the wiper device 10.

In the wiper device 10 having the aforementioned structure, the pivot holders 12 and 14 rotatably supporting the pivot shafts 20 and 22, respectively, are connected to each other via the hollow frame 42, and the wiper motor 58 is fixed directly to the mounting portion 48 (the flat bearing surface for mounting 50) of the hollow frame 42, thereby forming an assembly as a whole. In this assembled state, the positioning pin 68 provided at the housing 60 for the wiper motor 58 is inserted into the positioning hole formed at the vehicle body such that the wiper device 10 is positioned relative to the vehicle body and fixed to a vehicle body structural member provided below the windshield glass by mounting bolts inserted into the mounting holes 28 and 30 of the pivot holders 12 and 14, respectively.

Further, when the pivot shafts 20 and 22 are rotated due to the operation of the wiper motor 58, the wiper arms and the blades reciprocate pivotally in a predetermined range so as to wipe rain drops and the like on the windshield glass.

Here, since the wiper device 10 employs a hollow frame 42 (i.e., a pipe material having an annular cross-section), the frame as a whole has a high rigidity and is lightweight in essence. Further, the mounting portion 48, whose cross-section is substantially U-shaped and having the flat bearing surface for mounting 50, is formed at the intermediate position of the hollow frame 42 in the longitudinal direction, and the wiper motor 58 is fixed directly to the mounting portion 48 (the flat bearing surface for mounting 50) of the hollow frame 42. Therefore, even when the wiper motor 58 is firmly fixed to the mounting portion 48 by the bolts 64 and the nuts 66, the mounting portion 48 of the hollow frame 42 is not subjected to deformation.

Moreover, in the wiper device 10, the wiper motor 58 is fixed directly to the mounting portions 48 and 49 (the flat bearing surface for mounting 50) each having a non-hollow, substantially U-shaped cross-section and formed at the hollow frame 42 (the split frame 48A). Accordingly, even when the wiper motor 58 is firmly fixed to the mounting portions 48 and 49 of the hollow frame 42 by the bolts 64 and the nuts 66, the mounting portions 48 and 49 are not subjected to deformation.

In addition, since the wiper motor 58 is fixed directly to the flat bearing surface for mounting 50 (i.e., the flat surface portion) of the mounting portion 48 as described above, the mounting angle of the wiper motor 58 relative to the hollow frame 42 is set with stability. Furthermore, when the connecting portions 44 and 46 of the hollow frame 42 are crimped so as to be fixed corresponding to the shape of the concave portions 40 of the connecting shafts 32 and 34, respectively, adjustment and setting of the mounting angle of the above-mentioned mounting portion 48 (the flat bearing surface for mounting 50) relative to the vehicle body, i.e., the mounting angle of the wiper motor 58 relative to the vehicle body is made possible by pivoting the hollow frame 42 around the axis thereof in accordance with the state in which the pivot holders 12 and 14 are mounted, which state is determined in accordance with the type of the vehicle body.

Moreover, in the wiper device 10, the hollow frame 42 is formed from the pair of split frames 42A and 42B. The mounting portion 48 of the split frame 42A is positioned over the mounting portion 49 of the split frame 42B in an overlapping manner, and thereafter, the wiper motor 58 is fixed to the flat bearing surface for mounting 50 of the mounting portion 48 of the split frame 42A, thereby connecting and fixing the pair of split frames 42A and 42B to each other.

Figure 6C:
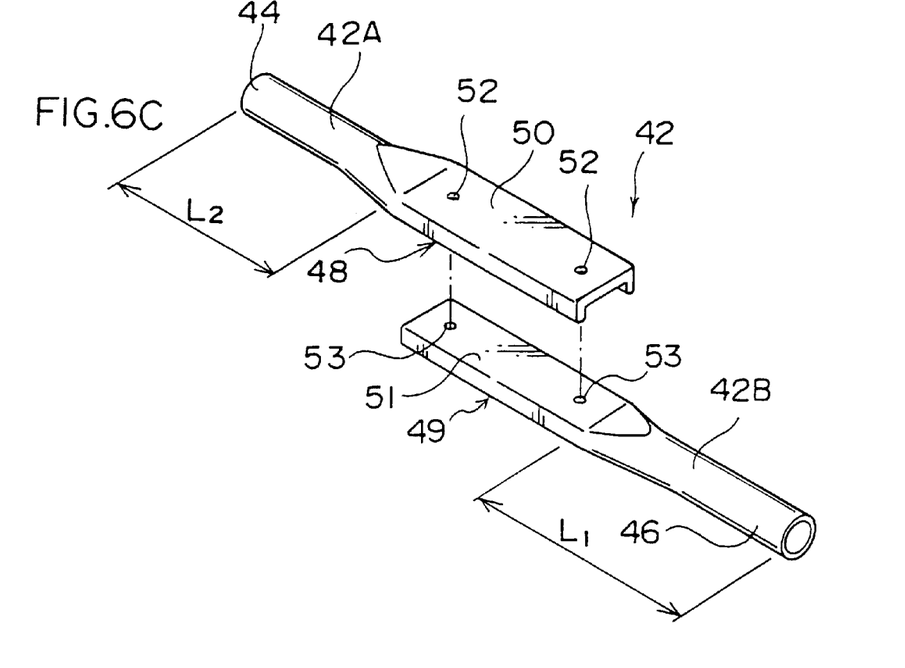
FIG. 6C is a perspective view showing the other split frame in the manufacturing process of the hollow frame of the wiper device according to the embodiment of the present invention.

Therefore, by preparing various types of split frames 42A and 42B having different lengths or the like (e.g., in FIG. 6C, those having connecting portions 44 and 46 or the like with different lengths $L_1$ and $L_2$, and those having different positions where the mounting holes 52 and 53 are formed) and changing the combinations of these split frames 42A and 42B so as to form a pair of split frames 42A and 42B, many types of hollow frames 42 can be formed using a few types of split frames 42A and 42B. For example, when three types of split frames 42A and 42B are respectively prepared, nine types of hollow frames 42 can be formed by changing the combinations of these split frames 42A and 42B. Namely, an optimum hollow frame 42 for the size of the vehicle (the transverse dimension of the vehicle, and the positions at which the pivot holders 12 and 14 are mounted) can be formed by changing the combinations of the split frames 42A and 42B.

In the wiper device 10, the wiper motor 58 is fixed to the hollow frame 42 by the bolts 64 which respectively pass through the mounting holes 52 and 53 formed in the split frames 42A and 42B. Further, by fixing the wiper motor 58 to the hollow frame 42, the pair of split frames 42A and 42B are connected and fixed to each other. In other words, the pair of split frames 42A and 42B are fastened together with the wiper motor 58 so as to be connected and fixed integrally thereto. Accordingly, the task of connecting the respective split frames 42A and 42B to each other and the task of fixing the wiper motor 58 to the hollow frame 42 can be achieved simultaneously, thereby improving work efficiency substantially.

Moreover, although the wiper motor 58 is fixed to the portion at which the pair of split frames 42A and 42B are connected to each other (i.e., the overlapping portion of the mounting portions 48 and 49), the wiper motor itself has a high rigidity (the wiper motor 58 has a housing of high rigidity). Therefore, the portion at which the above-described pair of split frames 42A and 42B are connected to each other is substantially reinforced by the wiper motor 58 having a high rigidity. That is, the portion at which the split frames 42A and 42B are connected to each other (the overlapping portion of the mounting portions 48 and 49) is reinforced so as to have a high rigidity by fixing the wiper motor 58 to the mounting portion 48. In this case, since no additional reinforcing member or the like for adding rigidity is employed, there is no unwanted increase in the number of parts and the weight of the wiper device.

Moreover, the connecting portions 44 and 46 of the hollow frame 42 which connect to the pivot holders 12 and 14, respectively, are each formed to have an annular cross-section. Further, the connecting portions 36 and 38, which connect the pivot holders 12 and 14 (the connecting shafts 32 and 34) to the hollow frame 42, are each formed to have a circular (or an annular) cross-section so as to fit together with the connecting portions 44 and 46 of the hollow frame 42. Furthermore, the connecting portions 44 and 46 of the hollow frame 42 are crimped so as to correspond to the shape of the concave portions 40 of the connecting shafts 32 and 34 so as to be connected and fixed to the connecting shafts 32 and 34, i.e., the connecting portions 44 and 46 of the hollow frame 42 engage the concave portions 40 of the connecting shafts 32 and 34 so as to be fixed thereto. Therefore, no special fixing parts such as rivets, bolts or the like are necessary, and the pivot holders 12 and 14 can be firmly connected and fixed to the hollow frame 42.

Further, when the connecting portions 44 and 46 of the hollow frame 42 are crimped so as to be fixed corresponding to the shape of the concave portions 40 of the connecting shafts 32 and 34, respectively, adjustment and setting of the mounting angle of the above-mentioned mounting portion 48 (the flat bearing surface for mounting 50) relative to the vehicle body, i.e., the mounting angle of the wiper motor 58 relative to the vehicle body is made possible by pivoting the hollow frame 42 around the axis thereof in accordance with the state in which the pivot holders 12 and 14 are mounted, which state is determined in accordance with the type of the vehicle body. In other words, the direction in which the wiper motor 58 is fastened and fixed to the hollow frame 42 is not limited, and there is degree of freedom in adjustment and setting of the mounting angle of the wiper motor 58 relative to the vehicle body.

Furthermore, the mounting portion 48 provided at the intermediate portion of the hollow frame 42 in the longitudinal direction thereof is formed so as to have a non-hollow, substantially U-shaped cross-section, and both ends (the connecting portions 44 and 46) of the hollow frame 42 are formed so as to have an annular cross-section. In addition, the gradually-changing portions 54 and 56 are provided whose cross-section gradually changes from a non-hollow configuration to a hollow configuration as the gradually-changing portions 54 and 56 run outward from the mounting portion 48 towards both ends (the connecting portions 44 and 46). Accordingly, since the cross-section of the hollow frame 42 does not change abruptly, stress concentration is not generated easily, and the possibility of forming cracks or the like can be reduced. For this reason, it is not necessary to increase the thickness of the member serving as the hollow frame 42 in order to attain a predetermined strength, and the hollow frame 42 having a high strength can be obtained even if the member serving as the hollow frame 42 is thin. Therefore, processing of the hollow frame 42 is simplified.

Further, in the wiper device 10, the hollow frame 42 is press-worked such that both ends thereof (the connecting portions 44 and 46) have an annular cross-section and are formed integrally with the mounting portion 48 which is provided at the intermediate portion of the hollow frame 42 and is formed so as to have a substantially U-shaped cross-section. In this case, the gradually-changing portions 54 and 56 whose cross-sectional configuration gradually changes from a non-hollow configuration to a hollow configuration are simultaneously formed by the same press-working process in which the mounting portion 48 is formed. For this reason, additional working processes can be omitted, and man-hours and the cycle of manufacture can be shortened.

Similarly, in the wiper device 10, since the pair of mounting holes 52 of the hollow frame 42 used for fixing the wiper motor 58 to the hollow frame 42 are formed by the same press-working process as the process in which the mounting portion 48 is formed, the addition of more working processes can be prevented. In particular, in a case in which the wiper motor 58 having the above-mentioned structure is fastened and fixed to the hollow frame 42 by bolts only, a threading process is necessary for the hollow frame 42 (the mounting portion 48) or the mounting legs 62 of the wiper motor 58. However, in the structure such as the embodiment of the present invention in which the wiper motor 58 is fastened and fixed to the hollow frame 42 by the bolts 64 and the nuts 66, no special processes such as the threading process are necessary for the mounting holes 52 of the hollow frame 42 and the mounting legs 62 of the wiper motor 58, thereby making it possible to prevent additional working processes. Further, although not shown, when the nut 66 is disposed within the substantial U-shape (within the gap between the side walls facing each other) as described above, a detent effect is achieved at the time of fastening the bolt 64 from the side of the flat bearing surface for mounting 50 by appropriately setting (selecting) the outer diameter of the nut 66 and positioning the nut 66 in such a way that the side faces of the nut 66 abut (or face) the inner surfaces of the side walls of the mounting portion 48 which are parallel to each other. As a result, the work of fastening the bolt 64 and the nut 66 can be simplified.

Since the mounting holes 52 are formed as described above, the wiper motor 58 can also be fixed by rivets in place of the bolts 64 and the nuts 66.

As described above, the wiper device 10 according to the embodiment is lightweight and has a high rigidity and strength. Further, in the wiper device 10, firm fixing is obtained between the wiper motor 58 and the hollow frame 42 without special fixing parts being required, and the hollow frame 42 is not subjected to deformation even when the wiper motor 58 is firmly fixed to the hollow frame 42. Furthermore, the mounting angle of the wiper motor 58 relative to the hollow frame 42 is set with stability, and adjustment and setting of the mounting angle of the wiper motor 58 relative to the vehicle body can also be made possible. In other words, the direction in which the wiper motor 58 is fastened and fixed to the hollow frame 42 is not limited, and there is degree of freedom in the direction.

As described above, in the wiper device 10 according to the embodiment, hollow frames 42 having many different sizes can be formed by changing combinations of the split frames 42A and 42B and can be applied to vehicles having different sizes and layouts.

Figure 7:
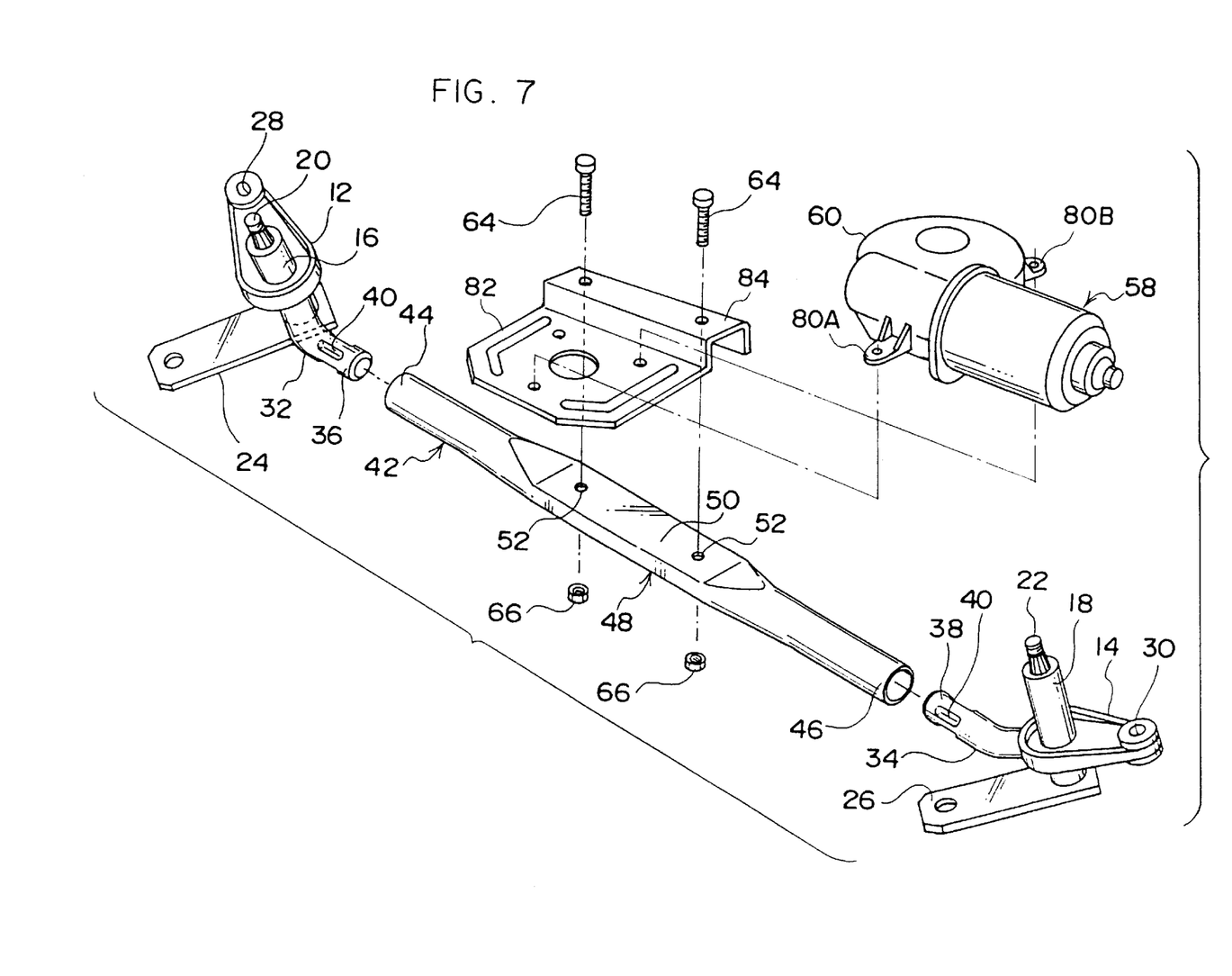
FIG. 7 is an exploded perspective view showing the structure of a principal portion of a wiper device according to another embodiment of the present invention.

Although the pair of mounting legs 62 are formed at the housing 60 for the wiper motor 58 in the above-described embodiment, the present invention is not limited to this structure. As shown in FIG. 7, the wiper motor body 58 may be fixed to a bracket 82, and a mounting leg 84 may be mounted to the hollow frame 42.

In the wiper device according to the present invention, it is preferable that the connecting portion of the hollow frame by which the hollow frame is connected to the pivot holder is formed so as to have an annular cross-section, and is fitted together with and connected to the connecting portion of the pivot holder by which the pivot holder is connected to the hollow frame.

In the wiper device according to the present invention, the connecting portion of the hollow frame connecting to the pivot holder is formed so as to have an annular cross-section, the connecting portion of the pivot holder connecting to the hollow frame is formed so as to have an annular or circular cross-section, and the connecting portion of the hollow frame and the connecting portion of the pivot holder are fitted together and connected to each other. Therefore, adjustment and setting of the mounting angle of the above-mentioned mounting portion (the flat bearing surface for mounting) relative to the vehicle body, i.e., the mounting angle of the drive source relative to the vehicle body is made possible by pivoting the hollow frame around the axis thereof. In other words, the direction in which the drive source is fastened and fixed to the hollow frame is not limited, and degree of freedom is provided for the direction.

In this way, in the wiper device according to the present invention, the mounting angle of the drive source relative to the frame is set with stability, and adjustment and setting of the mounting angle of the drive source relative to the vehicle body is also made possible.

In the wiper device according to the present invention, it is preferred that the pivot holder has convex and concave portions formed on the surface of the connecting portion of the pivot holder which fits together with and connects to the connecting portion of the hollow frame, and the connecting portion of the hollow frame connecting to the pivot holder is crimped so as to correspond to the convex and concave portions of the connecting portion of the pivot holder so as to be fixed and connected thereto.

In the wiper device according to the present invention, by crimping the connecting portion of the hollow frame connecting to the pivot holder, the hollow frame engages the convex and concave portions formed on the surface of the connecting portion of the pivot holder so as to be fixed thereto. Therefore, no special fixing parts such as rivets, bolts or the like are necessary, and the hollow frame can be firmly connected and fixed to the pivot holder.

In the wiper device according to the present invention, it is preferable that the hollow frame has a gradually-changing portion, the cross-section of which portion gradually changes from a non-hollow, substantially U-shaped cross-section to a hollow annular cross-section as the gradually-changing portion runs from the mounting portion toward the connecting portion of the hollow frame.

In the wiper device according to the present invention, the mounting portion provided at the intermediate portion of the hollow frame in the longitudinal direction is formed so as to have a non-hollow, substantially U-shaped cross-section, and both ends (the connecting portions) of the hollow frame are formed so as to have an annular cross-section. In addition, the gradually-changing portions are provided whose cross-section gradually changes from a non-hollow configuration to a hollow configuration as the gradually-changing portions run from the mounting portion towards both ends (the connecting portions). Accordingly, since the cross-section of the hollow frame does not change abruptly, stress concentration is not generated easily, and the possibility of forming cracks or the like can be reduced. For this reason, it is not necessary to increase the thickness of the member serving as the hollow frame in order to attain a predetermined strength, and the hollow frame having a high strength can be obtained even if the member serving as the hollow frame is thin. In addition, processing of the hollow frame is simplified.

In the wiper device according to the present invention, the gradually-changing portion is preferably formed simultaneously by the same press-working process as that in which the mounting portion is formed.

In the wiper device according to the present invention, it is preferred that the mounting portion of each of the pair of split frames has mounting holes used for fixing the drive source thereto, and the pair of split frames are connected and fixed to each other by fixing the drive source through the mounting holes.

In the wiper device according to the present invention, the drive source is fixed to the hollow frame through the mounting holes formed in the mounting portion (the flat bearing surface for mounting) of the split frames. Further, by fixing the drive source to the mounting portion, the pair of split frames are connected and fixed to each other. In other words, the pair of split frames are fastened together with the drive source so as to be connected and fixed to each other. Accordingly, the task of connecting the respective split frames to each other and the task of fixing the drive source to the hollow frame can be achieved simultaneously, thereby improving work efficiency substantially.

Moreover, although the drive source is fixed to the portion at which the pair of split frames are connected to each other (i.e., the overlapping portion of the mounting portions), the drive source (e.g., a motor) itself has a high rigidity. Therefore, the portion at which the pair of split frames are connected to each other is substantially reinforced by the drive source having a high rigidity. That is, the portion at which the split frames are connected to each other (the overlapping portion of the mounting portions) is reinforced so as to have a high rigidity by fixing the drive source to the mounting portion. In this case, since no additional reinforcing member or the like for adding rigidity is employed, there is no unwanted increase in the number of parts and the weight of the wiper device.

Further, in the wiper device according to the present invention, the hollow frame is press-worked such that both ends thereof (the connecting portions) have an annular cross-section and are formed integrally with the mounting portion which is provided at the intermediate portion of the hollow frame and is formed so as to have a substantially U-shaped cross-section. Moreover, in this case, the gradually-changing portions whose cross-sectional configuration gradually changes from a non-hollow configuration to a hollow configuration are simultaneously formed by the same press-working process in which the mounting portion is formed. For this reason, additional working processes can be omitted, and man-hours and the cycle of manufacture can be shortened.

In the wiper device according to the present invention, the mounting portion of the hollow frame has mounting holes used for fixing the drive source to the hollow frame, the mounting holes being formed by the same press-working process as the process in which a pipe material is press-worked to form the mounting portion.

In the wiper device according to the present invention, since the mounting holes used for fixing the drive source to the hollow frame are formed by the same press-working process as the process in which the mounting portion is formed, the addition of more working processes can be prevented.

What is claimed is:

1. A wiper device comprising:
    a plurality of pivot shafts, each pivot shaft having a distal end portion to which a wiper arm is fixed;
    a plurality of pivot holders fixed to a vehicle body, each pivot holder rotatably supporting each of said plurality of pivot shafts;
    a hollow frame including at least one single piece tubular component, said at least one tubular component including a modified tubular portion configured to receive a drive source, said hollow frame connecting each of said plurality of pivot holders to each other;
    said drive source fixed to said hollow frame; and
    a link rod for transmitting a driving force generated by said drive source to each of said plurality of pivot shafts,
        wherein said modified tubular portion includes a mounting portion having a non-hollow, substantially U-shaped transverse cross section, said U-shaped transverse cross section being formed by flattening an intermediate portion of said hollow frame in the longitudinal direction thereof, and said drive source is fixed to the mounting portion.

2. A wiper device according to claim 1, wherein a connecting portion of said hollow frame by which said hollow frame is connected to said pivot holder is formed so as to have an annular cross-section, and is fitted together with and connected to a connecting portion of said pivot holder by which said pivot holder is connected to said hollow frame.

3. A wiper device according to claim 2, wherein said pivot holder has convex and concave portions formed on the surface of the connecting portion of said pivot holder which fits together with and connects to the connecting portion of said hollow frame, and the connecting portion of said hollow frame connecting to said pivot holder is crimped so as to correspond to the convex and concave portions of the connecting portion of said pivot holder so as to be fixed and connected thereto.

4. A wiper device according to claim 1, wherein said hollow frame has a gradually-changing portion, said gradually-changing portion having a transverse cross-section which gradually changes from a non-hollow, substantially U-shaped cross-section at the mounting portion to a hollow annular cross-section at an end portion.

5. A wiper device according to claim 4, wherein the gradually-changing portion is formed simultaneously by the same press-working process as that in which the mounting portion is formed.

6. A wiper device according to claim 1, wherein said hollow frame has mounting holes formed in the mounting portion thereof and used for fixing said drive source thereto, the mounting holes being formed by the same press-working process as the process in which a hollow base material is press-worked to form the mounting portion.

7. A wiper device according to claim 1, wherein said drive source is an electric motor.

8. A wiper device according to claim 7, wherein the electric motor is fixed via a bracket to said hollow frame.

9. A wiper device comprising:

a plurality of pivot shafts, each pivot shafts having a distal end portion to which a wiper arm is fixed;

a plurality of pivot holders fixed to a vehicle body, each pivot holder rotatably supporting each of said plurality of pivot shafts;

a hollow frame connecting each of said plurality of pivot holders to each other;

a drive source fixed to said hollow frame; and a link rod for transmitting a driving force generated by said drive source to each of said plurality of pivot shafts, wherein said hollow frame includes a pair of split frames arranged to be connected together, each split frame including a mounting portion having a flat bearing surface for mounting said drive source directly thereon, the mounting portions being configured to overlap each other and to be connected and fixed to each other, the mounting portion of one of the pair of the split frames having a non-hollow, substantially U-shaped transverse cross-section, the mounting portion of the other of the pair of the split frames having a hollow, annular, transverse cross-section, said one of the pair of split frames being formed by flattening one end portion of a hollow base material, each split frame being connected to a corresponding one of the plurality of pivot holders.

10. A wiper device according to claim 9, wherein the mounting portion of each of the pair of split frames has mounting holes used for fixing said drive source thereto, and the pair of split frames are connected and fixed to each other by fixing said drive source to the mounting holes.

11. A wiper device according to claim 9, wherein each of the pair of split frames has a connecting portion extending at a predetermined length from the mounting portion toward the other end portion of the hollow base material, and a predetermined length of the connecting portion of the one of the pair of split frames is different from that of the connecting portion of the other of the pair of split frames.

12. A wiper device according to claim 9, wherein each of the pair of split frames has the mounting portion formed so as to have a non-hollow, substantially U-shaped cross-section, and a gragually-changing portion whose cross-section gradually changes from a non-hollow, substantially U-shaped cross-section to a hollow annular cross-section as the gradually-changing portion runs from the mounting portion toward the connecting portion.

13. A wiper device according to claim 9, wherein a connecting portion of said hollow frame by which said hollow frame is connected to said pivot holder is formed so as to have an annular cross-section, and is fitted together with and connected to a connecting-portion of said pivot holder by which said pivot holder is connected to said hollow frame.

14. A wiper device according to claim 13, wherein said pivot holder has convex and concave portions formed on the surface of the connecting portion of said pivot holder which fits together with and connects to the connecting portion of said hollow frame, and the connecting portion of said hollow frame connecting to said pivot holder is crimped so as to correspond to the convex and concave portions of the connecting portion of said pivot holder so as to be fixed and connected thereto.

15. A wiper device according to claim 9, wherein said drive source is an electric motor fixed via a bracket to said hollow frame.

\* \* \* \* \*